(12) United States Patent
Blevis (10) Patent No.: US 7,312,458 B2
(45) Date of Patent: Dec. 25, 2007

(54) METHOD AND APPARATUS FOR REDUCING POLARIZATION WITHIN AN IMAGING DEVICE

(75) Inventor: Ira Blevis, Zichron Yaakov (IL)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 11/159,374

(22) Filed: Jun. 22, 2005

(65) Prior Publication Data

US 2006/0289773 A1 Dec. 28, 2006

(51) Int. Cl.
*H01L 27/146* (2006.01)
(52) U.S. Cl. .................................. 250/370.09
(58) Field of Classification Search ............ 250/370.09
See application file for complete search history.

(56) References Cited

U.S. PATENT DOCUMENTS

| | | | | |
|---|---|---|---|---|
| 3,824,680 | A * | 7/1974 | Kozlov et al. | 29/592.1 |
| 5,248,885 | A * | 9/1993 | Sato et al. | 250/370.15 |
| 6,114,696 | A | 9/2000 | Eden | |
| 6,373,062 | B1 | 4/2002 | Ghelmansarai | |
| 7,078,703 | B2 * | 7/2006 | Watanabe | 250/370.15 |
| 2006/0097180 | A1 * | 5/2006 | Spartiotis et al. | 250/370.13 |

OTHER PUBLICATIONS

Clajus, Martin et al.; "CdZn Detectors for High-Flux X-Ray Imaging"; Nova R & D Inc.; pp. 1-10.
Redus, Bob; "Charge Trapping in XR-100T-CdTe and -CZT, Detectors"; Application Note (ANCZT-2 Rev 2) Revised Jan. 9, 2003; http://www.amptek.com/anczt2.html; 15 pgs.
Blevis, I. M. et al.; Measurement of X-Ray Photogeneration in Amorphous Selenium, Journal of Applied Physics; vol. 85. No. 11, Jun. 1, 1999; pp. 7958-7963.
Narita, T. et al.; "Development of Gold Contacted Flip-chip Detectors with IMARAD CZT"; arXiv:astro-ph/0008275 v1 Aug. 17, 2000; 8 pgs.
Narita, T. et al.; "Development of IMARAD CZT Detectors with PIN Contacts"; tnarita@cfa.harvard.edu; 11 pgs.
Jenkins, Jonathan A. et al.; Background Measurements from Balloon-Borne CZT Detectors; arXiv:astro-ph/0211529 v2 Dec. 3, 2002; 15 pgs.
Schlesinger, T.E.; "Semiconductors for Room Temperature Nuclear Detector Applications", Academic Press; vol. 43; Copyright 1995; pp. 319-322 and 372.

* cited by examiner

*Primary Examiner*—David Porta
*Assistant Examiner*—Mindy Vu
(74) *Attorney, Agent, or Firm*—The Small Patent Law Group; Dean D. Small (57) ABSTRACT

A method of reducing polarization within an image detecting device includes coupling at least one blocking contact to the image detecting device, and heating the image detecting device to facilitate reducing polarization within the image detecting device.

19 Claims, 7 Drawing Sheets

200

Coupling at least one blocking contact to an image detecting device. — 202

Heating the image detecting device to facilitate reducing polarization within the imaging device. — 204

METHOD AND APPARATUS FOR REDUCING POLARIZATION WITHIN AN IMAGING DEVICE

BACKGROUND OF THE INVENTION

This invention relates generally to imaging systems using pixilated detectors, and more particularly to pixilated semiconductor detectors in imaging systems.

Imaging devices, such as gamma cameras and computed tomography (CT) imaging systems, are used in the medical field to detect radioactive emission events for example, gamma rays in the range of 140 keV emanating from a subject, such as a patient and to detect transmission x-rays not attenuated by the subject, respectively. An output, typically in the form of an image that graphically illustrates the distribution of the sources of the emissions within the object and/or the distribution of attenuation of the object is formed from these detections. An imaging device may have one or more detectors that detect the number of emissions, and may have one or more detectors to detect x-rays that have passed through the object. Each of the detected emissions and x-rays may be referred to as a "count," but the detected emissions may also be counted together as a 'signal current'. The detector also determines the number of counts received at different spatial positions. The imager then uses the position dependent count tallies to determine the distribution of the gamma sources and x-ray attenuators, typically in the form of a graphical image having different colors or shadings that represent the processed count tallies.

A pixilated semiconductor detector, for example, fabricated from cadmium zinc telluride (CZT), may provide an economical method of detecting the gamma rays and x-rays. Specifically, at least one known imaging system includes a Room Temperature Semiconductor Radiation Detector (RTD) that is utilized to produce an image having a higher image quality. During operation, the RTD converts radiation photons to an electric charge (Q) using at least one of the photoelectric effect, the Compton effect, and/or electron-electron scattering. Converting photons directly to an electric charge facilitates eliminating the steps of light production and light detection and their corresponding inefficiencies that occur in the known scintillator technology. However, to operate at room temperature, RTD's must have sufficiently large Band Gap Energies (BG) to decrease the quantity of free charge carriers (N) in the material and allow the application of a higher bias voltage (Bias High Voltage HV). This allows the detection of signal pulses without producing a background electric current, referred to herein as a dark current ($I_d$). During operation, the dark current can saturate the readout electronics, and/or reduce the signal to noise ratio (SNR) when measuring the signal electric charge (Q). To measure the signal electric charge (Q), detection electrodes and electronics are applied to surfaces of the RTD. Provided the charge mobility ($\mu$) and carrier recombination lifetime ($\tau$) are high enough, the bias high voltage causes the detection of the electric charge (Q) on the electrodes and electronics.

However, known detectors that are fabricated using a Cadmium Zinc Telluride (CZT) material may have a dark current ($I_d$) that is not sufficiently controlled by the larger band gap. Accordingly, at least some known imaging systems include a cooling system to facilitate reducing the free charge carriers (N) and/or reducing the dark current ($I_d$). For example, at least one known imaging system includes a cooling system that utilizes liquid nitrogen to facilitate reducing the free charge carriers (N) and/or reducing the dark current ($I_d$). However, using a liquid nitrogen system is generally impractical for use in a commercial imaging system. Another known system uses circulating chilled water to control CZT and electronics temperatures, but this is also a significant cost in terms of engineering and safety. Moreover, at least one known imaging system utilizes a Peltier element to facilitate reducing the free charge carriers (N) and/or reducing the dark current ($I_d$) which facilitates avoiding the adverse increase of the dark current ($I_d$) that may be generated due to the heat of nearby objects, such as electronics, for example.

Accordingly, while known cooling systems may have a positive effect on reducing the dark current ($I_d$), the cooling systems may have an adverse effect on the charge mobility ($\mu$) and carrier recombination lifetime ($\tau$). For example, when the quantity of impurities and band edge states within the intrinsic semiconductor device increases, i.e. reduced grade detectors and/or doped semiconductor devices, cooling may decrease the charge mobility ($\mu$) and carrier recombination lifetime ($\tau$) by increasing the interaction of the electric charge (Q) with these localized states, referred to as shallow and deep traps. More specifically, when the semiconductor device is fabricated using a Cadmium Zinc Telluride (CZT) materiel, where the charge mobility ($\mu$) and carrier recombination lifetime ($\tau$) product is marginal, such traps may be a limiting factor.

BRIEF DESCRIPTION OF THE INVENTION

In one aspect, a method of reducing polarization within an image detecting device is provided. The method includes coupling at least one blocking contact to the image detecting device, and heating the image detecting device to facilitate reducing polarization within the image detecting device.

In another aspect, an image detecting device is provided. The image detecting device includes a substrate, a blocking contact coupled to the substrate, and a heat source configured to increase a temperature of said substrate to facilitate reducing polarization within the image detecting device.

In a further aspect, an imaging system is provided. The imaging system includes a radiation source configured to emit a flux of photons, an image detecting device configured to receive the flux of photons and generate a response based on the flux of photons, wherein the image detecting device includes a substrate fabricated using a cadmium zinc telluride (CZT), a blocking contact coupled to the substrate, and a heat source configured to increase a temperature of the substrate to facilitate reducing polarization within said image detecting device.

DETAILED DESCRIPTION OF THE INVENTION

Figure 1:
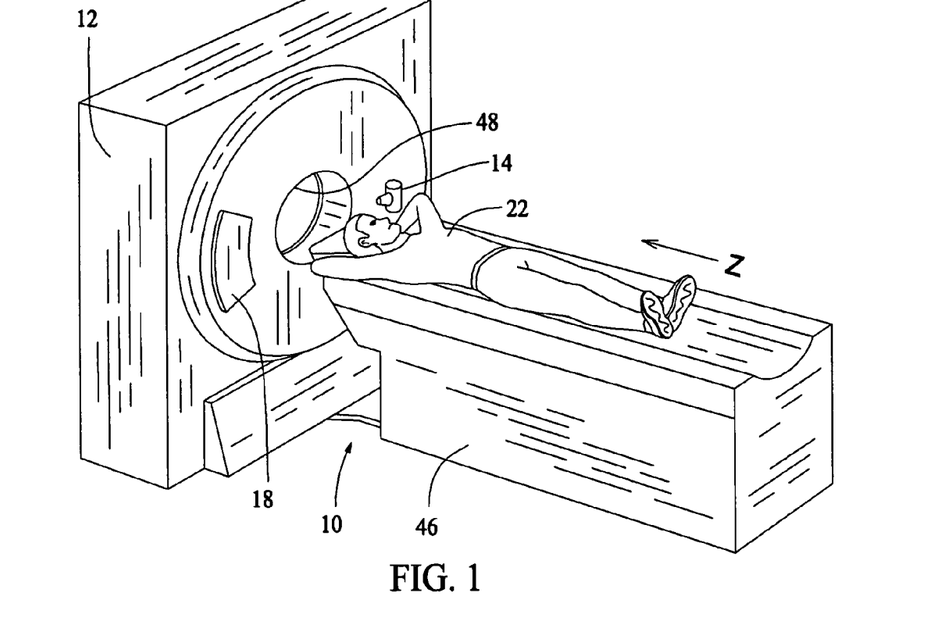
FIG. 1 is a pictorial view of a CT imaging system.
Figure 2:
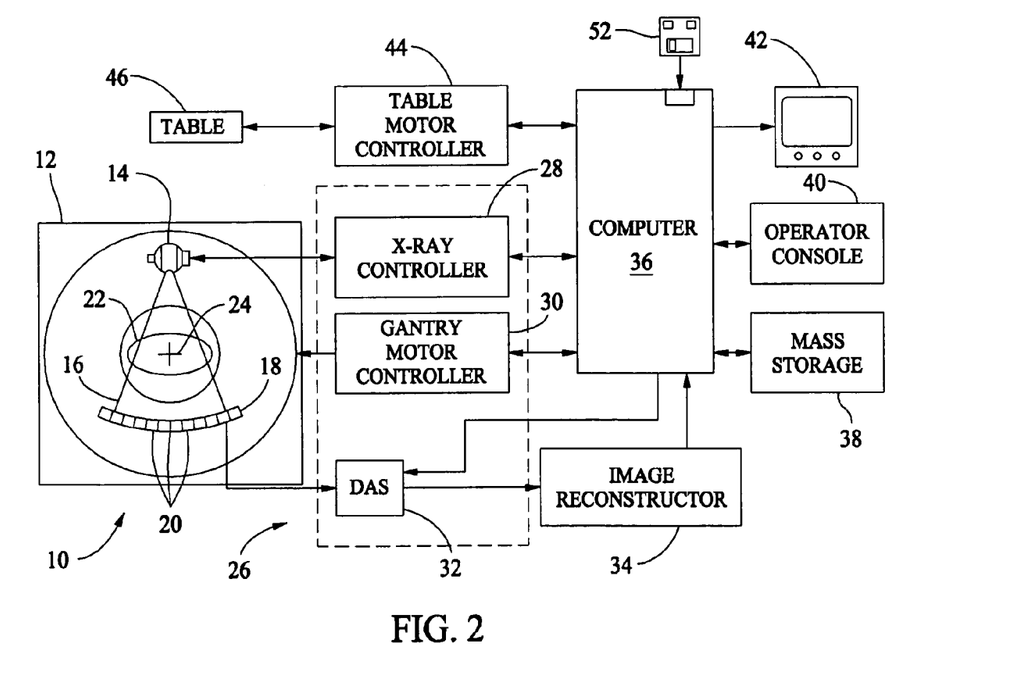
FIG. 2 is a block schematic diagram of the system illustrated in FIG. 1.

FIGS. 1 and 2 illustrate an exemplary imaging system, for example, a Computed Tomography (CT) imaging system. System 10 is shown as including a gantry 12 representative of a "third generation" CT imaging system. Gantry 12 has an x-ray tube 14 (also called x-ray source 14 herein) that projects a beam of x-rays 16 toward a detector array 18 on the opposite side of gantry 12. Detector array 18 is formed by a plurality of detector rows (not shown) including a plurality of detector elements 20 which together sense the projected x-rays that pass through an object, such as a medical patient 22 between array 18 and source 14. Each detector element 20 produces an electrical signal that represents the intensity of an impinging x-ray beam and hence can be used to estimate the attenuation of the beam as it passes through object or patient 22. During a scan to acquire x-ray projection data, gantry 12 and the components mounted therein rotate about a center of rotation 24. FIG. 2 shows only a single row of detector elements 20 (i.e., a detector row). However, multi-slice detector array 18 includes a plurality of parallel detector rows of detector elements 20 such that projection data corresponding to a plurality of quasi-parallel or parallel slices can be acquired simultaneously during a scan.

Rotation of components on gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of components on gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high-speed image reconstruction. The reconstructed image is applied as an input to a computer 36, which stores the image in a storage device 38. Image reconstructor 34 can be specialized hardware or computer programs executing on computer 36.

Computer 36 also receives commands and scanning parameters from an operator via console 40 that has a keyboard. An associated display 42, for example, a cathode ray tube or other suitable display device, allows the operator to observe the reconstructed image and other data from computer 36. The operator supplied commands and parameters are used by computer 36 to provide control signals and information to DAS 32, x-ray controller 28, and gantry motor controller 30. In addition, computer 36 operates a table motor controller 44, which controls a motorized table 46 to position patient 22 in gantry 12. Particularly, table 46 moves portions of patient 22 through gantry opening 48.

In one embodiment, computer 36 includes an instruction reading or receiving device 50, for example, a floppy disk drive, CD-ROM drive, DVD drive, magnetic optical disk (MOD) device, or any other digital device including a network connecting device such as an Ethernet device for reading instructions and/or data from a computer-readable medium 52, such as a floppy disk, a CD-ROM, a DVD or another digital source such as a network or the Internet, as well as yet to be developed digital means. In another embodiment, computer 36 executes instructions stored in firmware (not shown). Computer 36 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein. Although the specific embodiment mentioned above refers to a third generation CT system, the methods described herein equally apply to fourth generation CT systems (stationary detector—rotating x-ray source) and fifth generation CT systems (stationary detector and x-ray source). Additionally, it is contemplated that the benefits of the invention accrue to imaging modalities other than CT. Additionally, although the herein described methods and apparatus are described in a computed tomographic imaging system, it is contemplated that the benefits of the invention accrue to other medical and non-medical imaging systems such as a gamma camera, and/or those systems typically employed in an industrial setting or a transportation setting for Non-Destructive Testing, such as, for example, but not limited to, a baggage scanning system for an airport or other transportation center.

Figure 3:
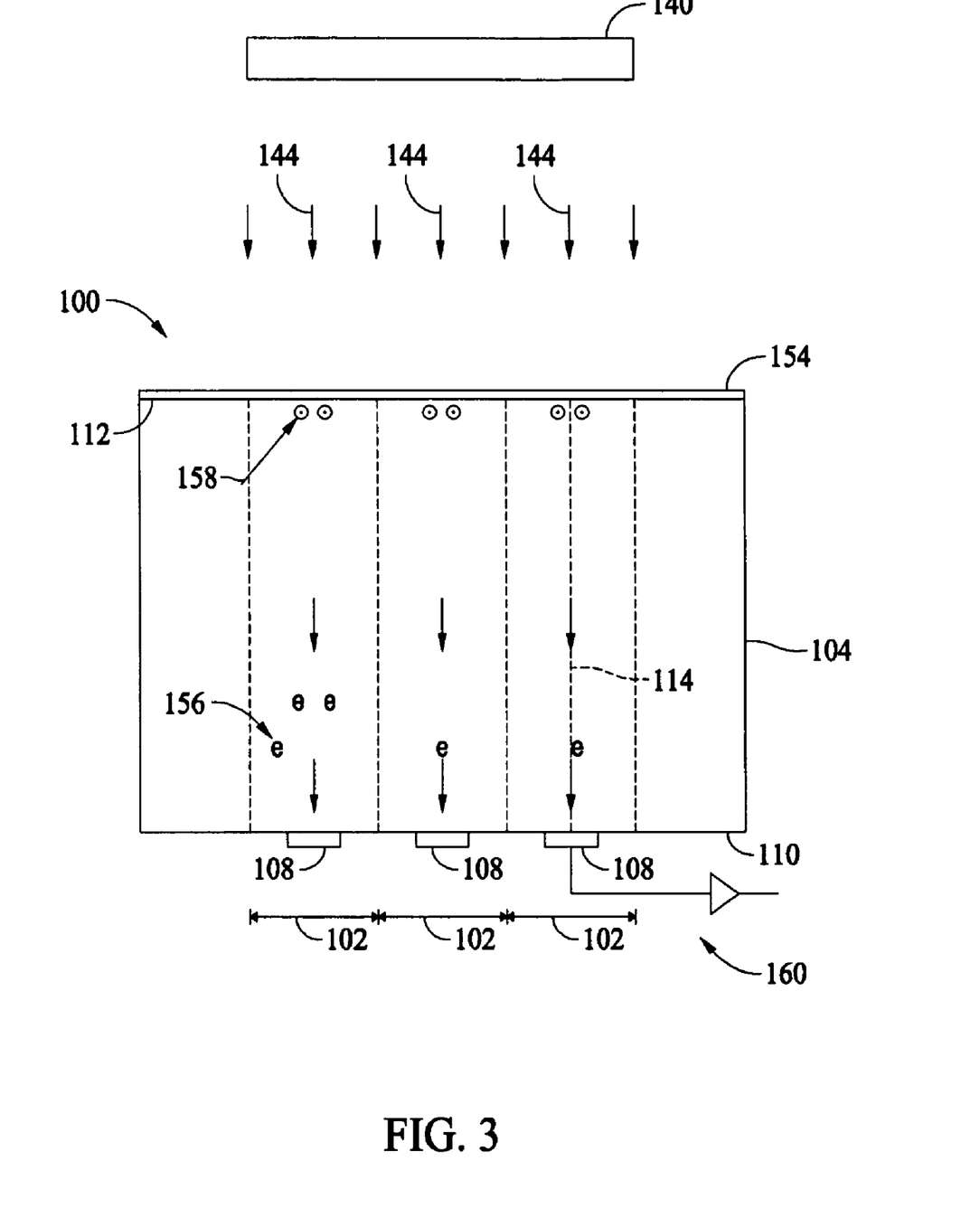
FIG. 3 is a cross-sectional view of an exemplary radiation detector having a plurality of pixilated semiconductor detector elements.

FIG. 3 is a cross-sectional elevation view of an exemplary imaging device detector 100, that can be used with imaging system 10, in accordance with one embodiment of the present invention and includes a plurality of pixilated semi-conductor detector elements 102 that may be used in connection with, for example, localizing a radiation interaction event in the detector, and a detector substrate 104. Detector 100 may be formed of a radiation responsive semiconductor material, for example, cadmium zinc telluride (CZT) crystals. Detector elements 102 may be formed on substrate 104 by pixelating a corresponding plurality of pixel electrodes 108, also referred to herein as anodes, coupled to a first surface 110 of detector substrate 104 (shown as a lower surface). A cross-sectional size and shape of pixel electrodes 108 and a spacing between each of the pixel electrodes 108 facilitates determining a location and size of each pixilated detector element 102. Specifically, each pixilated detector element 102 is located proximate a second surface 112 (shown as an upper surface) of detector substrate 104 in substantial alignment with a longitudinal axis 114 of a corresponding pixel electrode 108. An intrinsic spatial resolution of detector 100 may be defined by the size of and the spacing between each pixilated detector element 102.

Moreover, in the exemplary embodiment, second surface 112 may be substantially covered by a single cathode electrode 154. First surface 110 has a rectangular (or hexagonal or otherwise) array of small, for example between about one millimeters squared ($mm^2$) and about ten $mm^2$, generally square pixel electrodes 108 configured as anodes. A voltage difference applied between pixel electrodes 108 and cathode 154 during operation generates an electric field (detector field) in substrate 104. The detector field may be, for example, about one kilovolts per centimeter to three kilovolts per centimeter. Although pixel electrodes 108 are described in the exemplary embodiment as being generally square, this shape should not be understood to be limiting, in that other shapes of pixel electrodes 108 are contemplated, in particular, round, or area filling shapes.

In operation, an uncollimated flux of photons 144, for example emission gammas and transmission x-rays 144, from a source 140 are directed towards second surface 112. When a photon is incident on substrate 104, it generally loses all its energy in substrate 104 by absorption and subsequent ionization and leaves pairs of mobile electrons 156 and holes 158 in a small localized region of substrate 104. As a result of the detector field, holes 158 drift toward cathode 154 and electrons 156 drift toward pixel electrodes 108, thereby inducing charges on pixel electrodes 108 and cathode 154. The induced charges on pixel electrodes 108 are detected and identify the time at which a photon was detected, how much energy the detected photon deposited in the substrate 104 and where in the substrate 104 the photon interaction occurred using readout electronics 160, for example. Moreover, the induced charge on 154, can also be utilized by readout electronics 160 to determine timing and energy information.

In an alternative embodiment, the imaging device includes a collimator (not shown) that includes a plurality of apertures defined through the collimator. During operation, photons, for example emission gammas and transmission x-rays, from source 140 are directed towards and/or through the collimator. The photons are collimated utilizing the collimator, such that a collimated flux of photons is directed towards surface 112.

Figure 4:
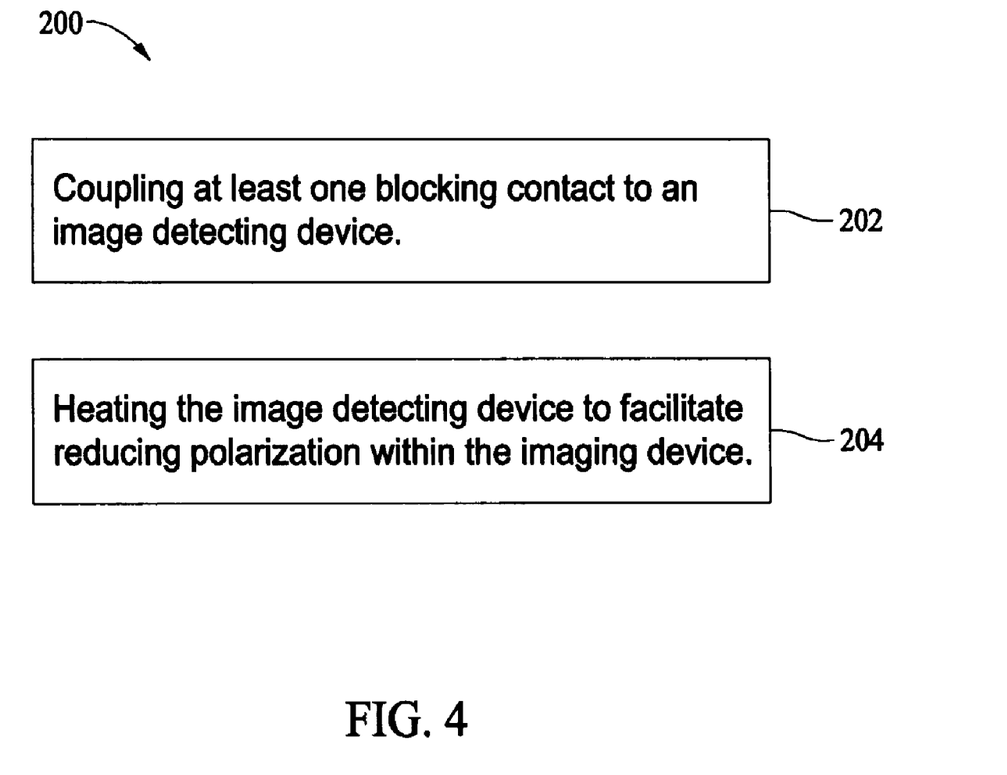
FIG. 4 is a flowchart illustrating an exemplary method of reducing polarization within the detector shown in FIG. 1.

FIG. 4 is a flow chart illustrating an exemplary method 200 to facilitate reducing polarization within detector 100. As used herein, polarization is defined as a buildup of electric charge that occurs within detector 100. Accordingly, method 200 facilitates reducing and/or eliminating the conditions i.e charge trapping, that causes polarization.

In the exemplary embodiment, method 200 includes coupling 202 at least one blocking contact to an image detecting device, and heating 204 the image detecting device to facilitate increasing an operational temperature of the imaging device.

Figure 5:
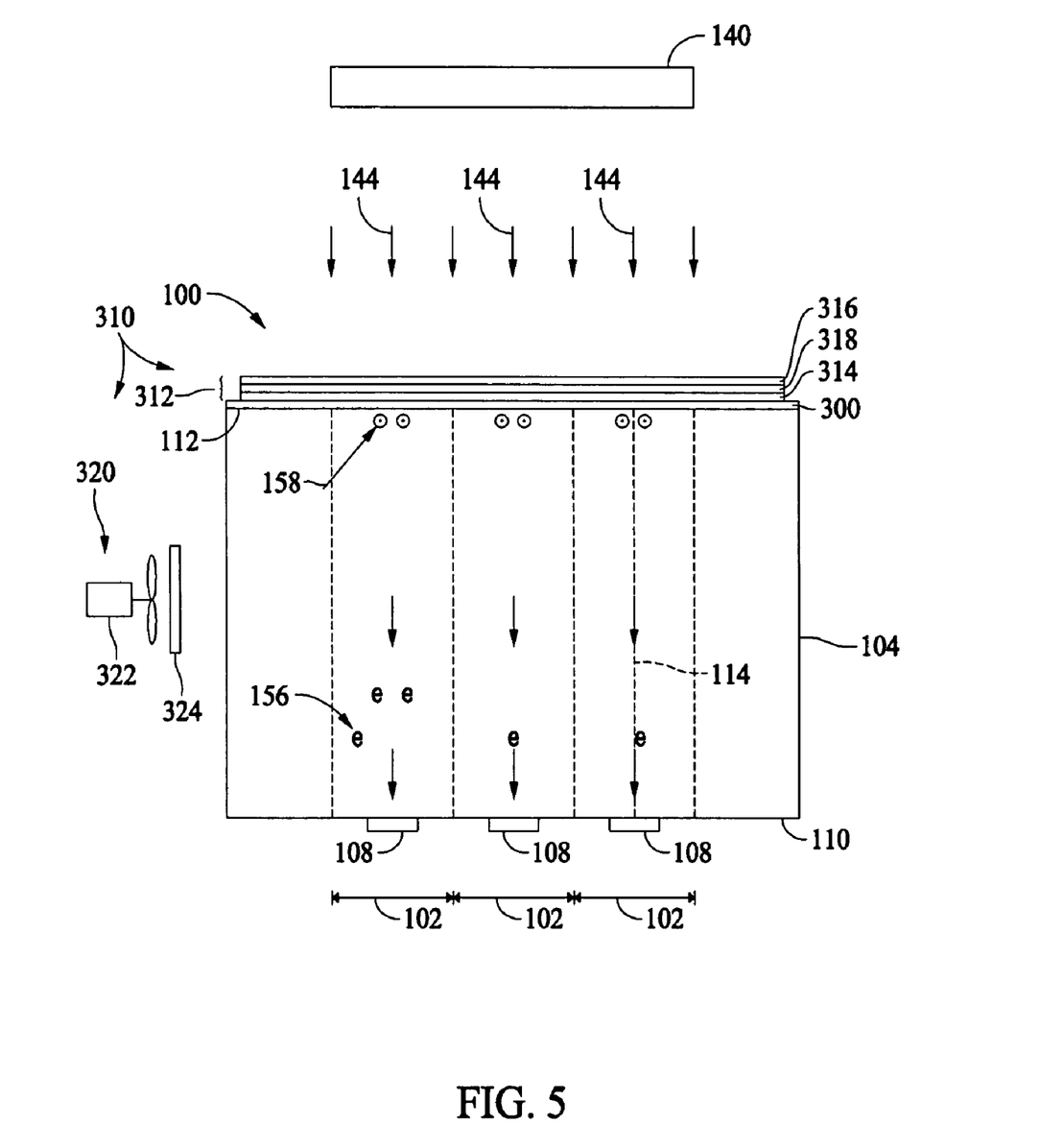
FIG. 5 is a cross-sectional view of the radiation detector shown in FIG. 1 that includes an exemplary heat source and an exemplary blocking contact.

FIG. 5 is a cross-sectional view of exemplary detector 100 that includes at least one blocking contact 300. As used herein, blocking contact (electrode) is one for which charge carriers are impeded from entering the semiconductor material from the contact even though an applied voltage would force them that way. For example, blocking contact 300 may be fabricated utilizing a Gold and/or platinum layer that is applied as a cathode to a surface of the semiconductor detector and provides a potential energy step to the motion of the carriers. Thus as in a Shottky barrier junction the carrier motion is facilitated in the direction that releases energy and is impeded in the direction that absorbs energy. Shottky junctions and blocking contacts may be prepared in other fashions such as by stacking layers of doped semiconductors or by incorporating intermediate layers of dielectric material such as oxides as well as by other means. Not all metal electrodes are blocking contacts. For examples an Indium cathode is not a blocking contact for electron carriers. A unique characteristic of blocking contacts as described herein is that a photocurrent increases with the decreasing temperature of the detector. The blocking layer that is useful in limiting the dark current will be on the cathode side for the case that the electrons have higher mobility, and on the anode side for the case that the holes or positive carriers have the higher mobility. In CZT the electrons have the higher mobility. Accordingly, blocking contacts 300 are applied to a surface of detector 100.

In the exemplary embodiment, detector 100 also includes an external heat source 310 that is configured to increase an operational temperature of detector 100. For example, during normal operation, a temperature within detector 100 will either increase and/or decrease based on the power supplied to electronics attached to the detector 100 and/or a temperature of the outside environment in which detector 100 is operated. For example, the ambient air temperature within the examination room may either increase and/or decrease, thus either increasing and/or decreasing the operational temperature of detector 100. Therefore, as used herein, the term operating temperature of detector 100 is used to define the temperature of detector 100 operated under typical conditions within a known detector operating environment.

Accordingly, and in the exemplary embodiment, detector 100 also includes external heat source 310 that is configured to increase an operating temperature of detector 100 to a temperature that is greater than the typical operating temperature. For example, and in the exemplary embodiment, heat source 310 includes a heating device 312 that is positioned on top of blocking contacts 300. In the exemplary embodiment, heating device 312 includes a first electrically insulating layer 314, a second electrically insulating layer 316, and an electrical heating element 318 that is positioned between first and second layers 314 and 316, respectively, First and second layers 314 and 316 are fabricated from a material that is optimally configured to transmit heat generated by heating element 318 to detector 100, thus increasing an operational temperature of detector 100. In the exemplary embodiment, first and second layers 314 and 316 are fabricated from a relatively thin plastic polymer material, for example.

During operation, heating element 318 is activated such that a temperature of heating element 318 is increased. Increasing a temperature of heating element 318 facilitates conductively heating first and second layers 314 and 316, thus heating an external surface of detector 100. In the exemplary embodiment, a voltage is applied to heating element 318 to facilitate activating heating element 318. Specifically, as the voltage applied to heating element 318 is increased, an operating temperature of detector 100 is also increased. Thus, the voltage may be varied and controlled automatically to facilitate operating detector 100 at a desired temperature.

In another exemplary embodiment, heat source 310 includes a heating device 320 that is positioned adjacent detector 100. In the exemplary embodiment, heating device 320 includes an electric fan assembly 322, and a heat generating device 324. In one embodiment, heat generating device 324 is a radiator, for example, that has a relatively warm heating fluid flowing therethrough. In another embodiment, heat generating device 324 is an electrical heating element that includes a plurality of openings extending therethrough.

During operation, fan assembly 322 is activated such that at least a portion of the air flow generated by fan assembly 322 is channeled through heat generating device 324 to facilitate increasing a temperature of the airflow. The heated air is then directed to an exterior surface of detector 100, thus heating an external surface of detector 100. In the exemplary embodiment, a temperature within detector 100 is maintained between approximately 10° C. and approximately 100° C. depending on other material factors.

Figure 6:
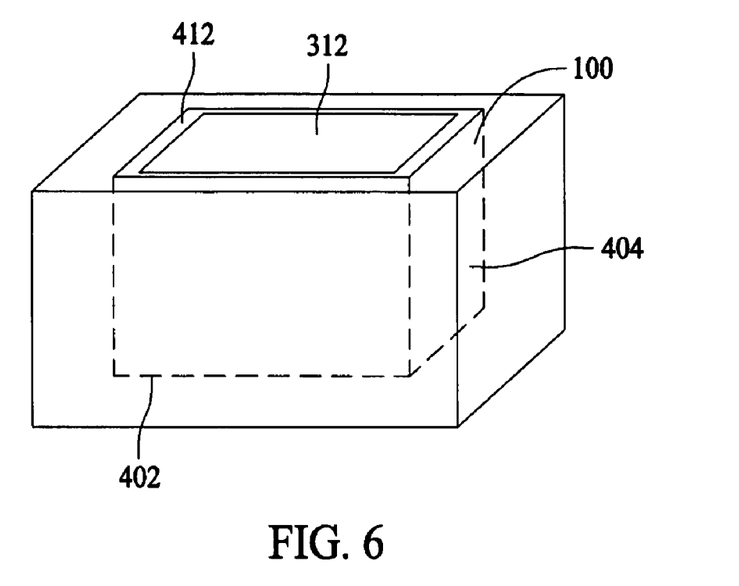
FIG. 6 is a perspective view of the radiation detector shown in FIG. 3 that includes an exemplary insulation covering.
Figure 7:
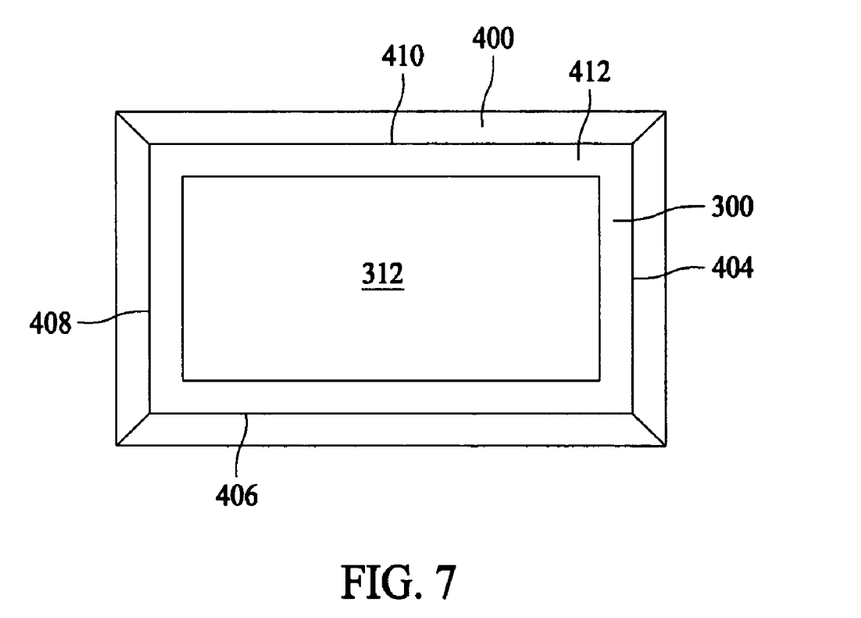
FIG. 7 is a top view of the radiation detector shown in FIG. 4.

FIG. 6 is a perspective view of detector 100 that includes an insulating layer 400 that at least partially surrounds detector device 100. FIG. 7 is a top view of radiation detector 100 shown in FIG. 6. More specifically, detector 100 includes a bottom surface 402, a first side 404, a second side 406, a third side 408 that is opposite first side 404, and a fourth side 410 that is opposite second side 406. Detector 100 also includes an upper surface 412. In the exemplary embodiment, detector upper surface 412 is at least partially covered by blocking contact 300 as described previously herein. In the exemplary embodiment, heating device 312 is positioned on top of blocking contacts 300 to facilitate increasing a temperature within detector 100. Moreover, in the exemplary embodiment, detector 100 also includes insulating layer 400 to facilitate retaining heat that is generated utilizing heating device 312 with detector 100. More specifically, at least one of bottom surface 402, first side 404, second side 406, third side 408, and fourth side 410 may be, or may not be, at least partially covered with insulation layer 400 to facilitate retaining heat within detector 100. In the exemplary embodiment, bottom surface 402, first side 404, second side 406, third side 408, and/or fourth side 410 are each substantially covered with insulation layer 400 to facilitate retaining heat within detector 100. In another embodiment, bottom surface 402, first side 404, second side 406, third side 408, fourth side 410, and heating device 312, i.e. the upper surface of detector 100, are covered with insulation layer 400 to facilitate retaining heat within detector 100, i.e. detector 100 and/or multiple detector assemblies are completely encased together or separately within insulation layer 400. In the exemplary embodiment, if insulating layer 400 is utilized to at least partially cover the surface of the incident radiation, for example, the cathode side of detector 100, then the insulating layer 400 is fabricated from a material that is substantially transparent to the radiation, for example, insulating layer is between approximately 2 millimeters and approximately 5 millimeters in thickness, and fabricated from a foam rubber, for example.

In one embodiment, insulation layer 400 is a foam insulation that is selectively sized to at least partially encapsulate detector 100. In another embodiment, insulation layer 400 is an insulating blanket formed using a fibrous insulation for example, that is wrapped around at least a portion of the exterior surfaces of detector 100.

Utilizing insulation layer 400 as described herein facilitates maintaining the increased operational temperature within detector 100. For example, during operation heating device 312 is utilized to increase the operating temperature of detector 100 to a predetermined operational temperature. When a temperature of the detector has reached the predetermined temperature, insulation layer 400 facilitates maintaining the detector at the predetermined temperature, thus the power consumed by heating device 100 is reduced, since heating device 312 is not utilized to compensate for heat losses to the surrounding environment, thus insulating layer 400 facilitates reducing detector heat loss, and thus reduces the total power consumed by detector 100 including heating device 312. The insulation would also make the temperature easier to control by sensors and control circuits.

Figure 8:
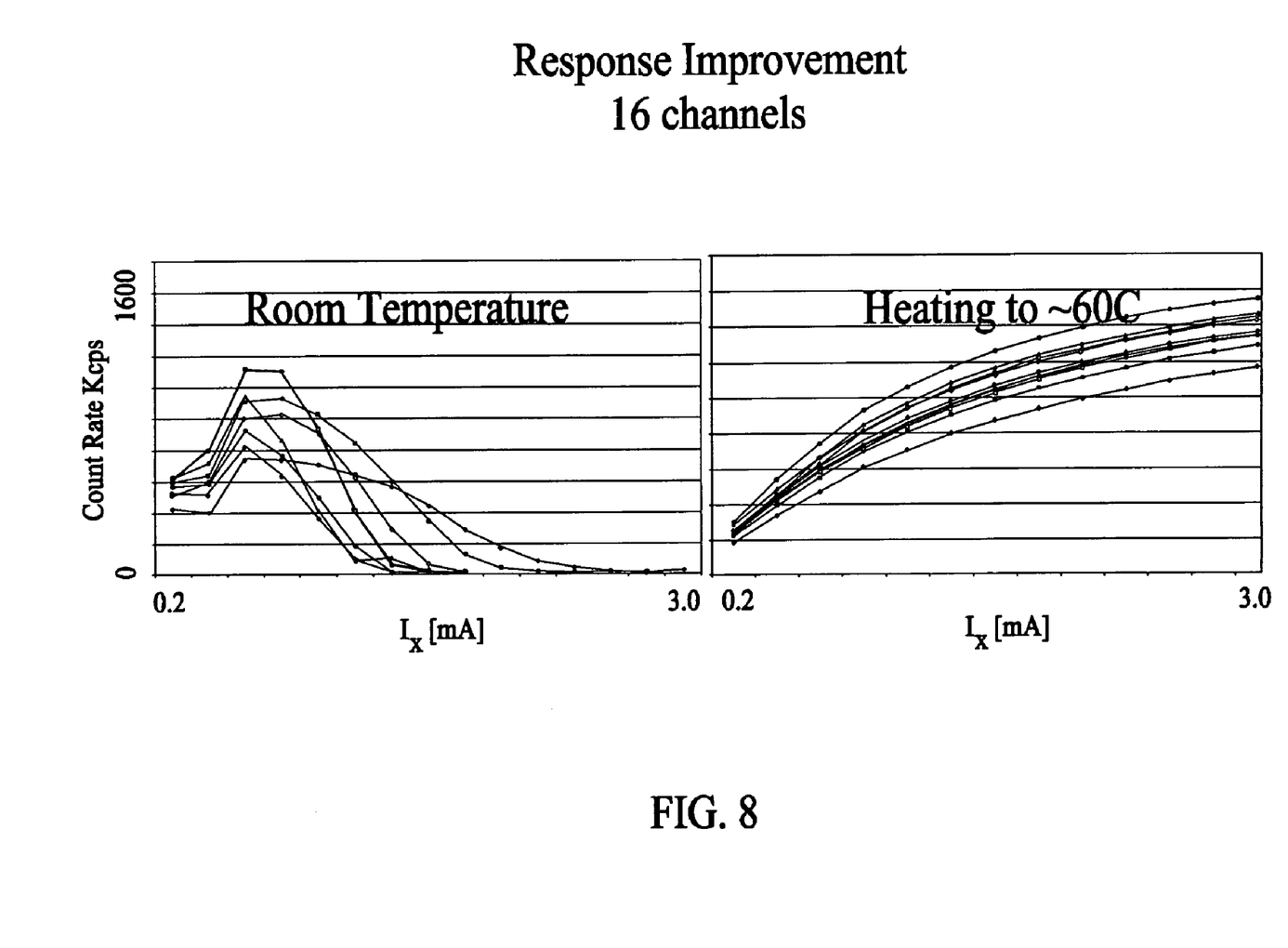
FIG. 8 is a graphical illustration of the detector shown in FIG. 3 during normal operation.

FIG. 8 is a graph of measured data of a detector 100 with blocking contact 300 that is heated utilizing heat source 310 (shown in FIG. 5). The x-axis is the magnitude of the incident radiation flux as measured by the x-ray generator current control parameter. The y-axis is the measured count rate in the detector. The response curves of several pixels 102, 108 and 160 are shown. At a relatively low temperature, approximately 26° C., the measured count rate (kcps) falls to approximately 0 at relatively high flux, whereas at a relatively high temperature (approximately 60° C.) the measured count rate continues to increase as a function of the incident flux ($I_x$).

Figure 9:
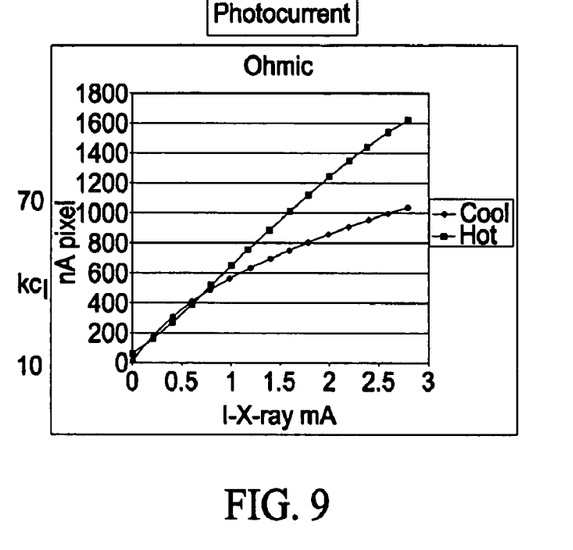
FIG. 9 is a graphical illustration of a known detector during normal operation.
Figure 10:
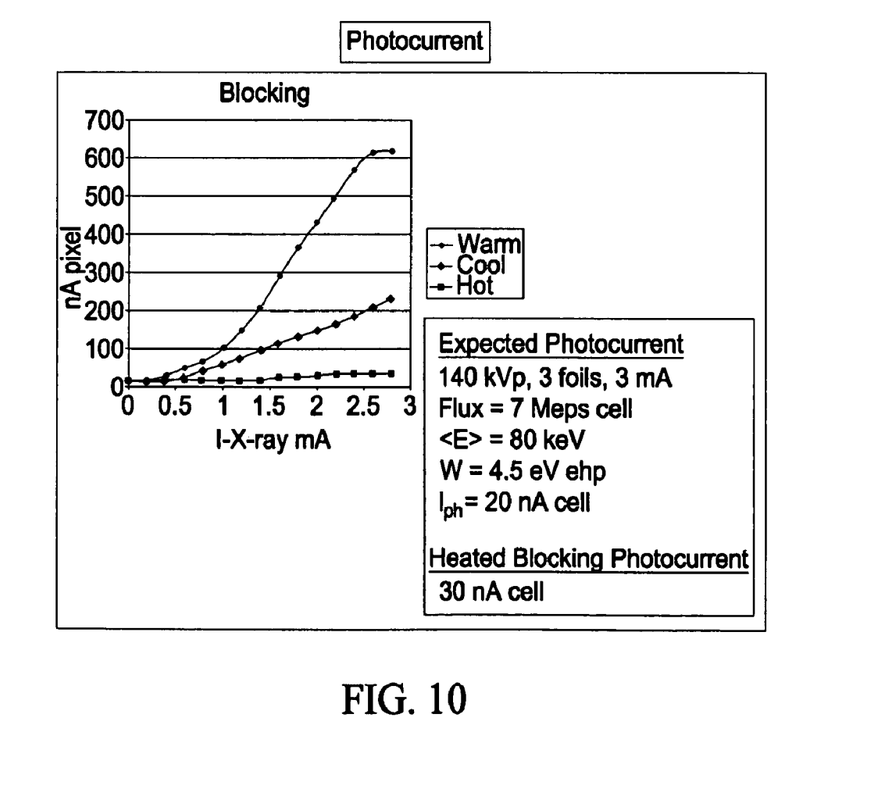
FIG. 10 is a graphical illustration of the detector shown in FIG. 4 during normal operation.

FIG. 9 is a graph of the photo current for a known detector during normal operation. Photo current is combination of the signal current attributable to the flow of the charge generated from absorbed x-ray or gamma ray photons and the dark current. In detectors known as 'ohmic' in the trade the dark current increases with flux, a phenomena sometimes called photoconductive gain. This dark current contribution to the photocurrent causes the same problems of amplifier overload, signal dependent heating described above for the dark current by itself. FIG. 10 is a measured graph of detector 100 showing a reduced photo current under conditions of high flux and sustained operation achieved using the methods and apparatus described herein. More specifically, FIG. 9 illustrates along the Y-axis, the dark current per pixel, 102, 108, and 160 of CZT measured. As shown, the dark current ($I_d$) increases with Flux and Temperature for a CZT sample fabricated using non blocking, or ohmic contacts, for example. FIG. 10 illustrates that although the photo current ($I_d$) still increases with flux using a blocking contact 300, heating the detector utilizing heat source 310 substantially eliminates the increase commensurate with the flux. The calculation in the inset box show that the photo-current is equal to the signal current alone with no significant contribution from dark current caused by photoconductive gain. Thus, at low temperature the current increases with flux and the signal disappears with flux. This behavior is supposed to be caused by polarization charge causing increased current emanating from the cathode and decreased E field in the detector bulk. Accordingly, utilizing both blocking contact 300 and heat source 310 facilitates both reducing dark currents and reducing polarization within detector 100, Reducing polarization in turn reduces the dark current emanating from the cathode while at the same time preserving the E field in the bulk and the thereby the detector operation even at high flux.

The above-described imaging device detectors provide a cost-effective and reliable means for reducing polarization within an imaging detector. More specifically, the imaging detector includes a blocking contact and a heat source that work together to reduce currents and polarization within detector 100.

The detector components illustrated are not limited to the specific embodiment described herein, but rather, components of the detector may be utilized independently and separately, or repetitively from other components described herein. For example, the detector components described above may also be used in combination with different imaging systems. A technical effect of the embodiment of the systems and methods described herein includes improving the detector performance, i.e. high flux, dark current, and spectral improvement, within a detector fabricated using a CZT material, by coupling at least one blocking contact to the detector, and heating the detector to a temperature that is greater than the typical operating temperature of known detectors.

Moreover, the combination of heating the detector and utilizing a blocking contact allows mainly the unique combination of lowered dark current and higher charge mobility and lifetime. This in turns allows critical improvements of the energy spectrum and high rate operation for the applications of NM and CT. Additionally, the combination of heating the detector and utilizing a blocking contact facilitates preventing high flux desensitization, signal dependent instabilities, and energy response degradation, while increasing the useful flux limit. Moreover, reducing the dark currents allows the detector to be directly coupled to the readout electronics. Direct coupled electronics are significantly simpler to build and allow reduced input capacitance. Reduced input capacitance allows reduced noise and increased signal. Low dark current prevents signal dependent heating in the semiconductor which is a source of gain and count rate instability. Signal dependent instabilities are very important and cannot be calibrated away and thus may prevent the use of semiconductor detectors in the critical applications of medical imaging. Thus, Improving detector response at high and low fluxes utilizing the methods and apparatus described herein facilitates a manufacturer to utilize lower and/or relatively less expensive grades of CZT material to fabricate the detector. Accordingly, the detector described herein can achieve photon counting in transmission medical imaging, thereby providing the signal noise (sometime called Swank noise) reduction anticipated by photon counting techniques. This noise reduction can result in improved image quality or reduced patient dose. Photon counting in transmission medical imaging can also reduce the noise derived from dark current in current mode detectors that affects the parts of the image derived from the smallest detector signal amplitudes. Moreover, the single response, i.e. reduced spectral tail, semiconductor radiation detector described herein can be utilized in a nuclear medicine application such a simultaneous dual isotope imaging where the energies of the two sources are too close to be resolved by the known detectors. The successful operation of CZT for the NM application with a reduced tail spectral component also allows the sensitivity/resolution tradeoff currently made to be further optimized. Improved energy resolution in transmission imaging can allow energy resolution and therefore materials determination in a calcium scoring application, for example.

While the invention has been described in terms of various specific embodiments, those skilled in the art will recognize that the invention can be practiced with modification within the spirit and scope of the claims.

What is claimed is:

1. A method of improving the performance of an image detecting device comprises:
   coupling at least one blocking contact to the image detecting device; and
   heating the image detecting device to facilitate reducing polarization within the image detecting device, wherein heating the image detecting device comprises heating the blocking contact.

2. A method in accordance with claim 1 further comprising fabricating at least a portion of the image detecting device using a cadmium zinc telluride (CZT) material.

3. A method in accordance with claim 1 wherein coupling at least one blocking contact to the image detecting device further comprises coupling at least one blocking contact fabricated at least partially from at least one of a gold material and a platinum material to the image detecting device.

4. A method in accordance with claim 1 wherein heating the image detecting device further comprises:
   positioning a heating element on the at least one blocking contact such that the heating element is in thermal contact with the at least one blocking contact; and
   energizing the heating element to facilitate increasing an operating temperature of the image detecting device.

5. A method in accordance with claim 4 further comprising insulating at least a portion of the image detecting device to facilitate maintaining the increased temperature within the image detecting device.

6. A method in accordance with claim 1 wherein heating the image detecting device further comprises:
   coupling a heat generating device adjacent the image detecting device; and
   activating a fan assembly such that air is channeled through the heat generating device to facilitate increasing a temperature of the air; and
   channeling the heated air to the image detecting device to facilitate increasing the operational temperature of the image detecting device.

7. A method in accordance with claim 1 wherein heating the image detecting device further comprises heating the image detecting device such that an internal temperature of the image detecting device is between approximately 10° C. and approximately 100° C.

8. An image detecting device comprising:
   a substrate;
   a blocking contact coupled to said substrate; and
   a heat source configured to increase a temperature of said substrate to facilitate reducing polarization within the image detecting device, wherein said heat source comprises a heating element coupled to said blocking contact such that said heating element is in thermal contact with said blocking contact, said heating element configured to increase an operating temperature of the image detecting device.

9. An image detecting device in accordance with claim 8 wherein said substrate comprises cadmium zinc telluride (CZT).

10. An image detecting device in accordance with claim 8 wherein said blocking contact comprises at least one of a gold material and a platinum material.

11. An image detecting device in accordance with claim 8 wherein said image detecting device further comprises an insulation material surrounding at least a portion of said substrate, said insulation material configured to facilitate maintaining the increased temperature within the image detecting device.

12. An image detecting device in accordance with claim 8 wherein said heat source comprises:
   a heat generating device coupled adjacent to said substrate; and
   a fan assembly configured to channel an airflow through said heat generating device to facilitate increasing a temperature of the air, and to channel the heated airflow to said substrate to facilitate increasing the operational temperature of the image detecting device.

13. An image detecting device in accordance with claim 8 wherein said heat source is configured to increase an internal temperature of said substrate to between approximately 10° C. and approximately 100° C.

14. An imaging system comprising:
   a radiation source configured to emit a flux of photons;
   an image detecting device configured to receive the flux of photons and generate a response based on the flux of photons, said image detecting device comprising:
      a substrate fabricated using a cadmium zinc telluride (CZT);
      a blocking contact coupled to said substrate; and
      a heat source configured to increase a temperature of said substrate to facilitate reducing polarization within said image detecting device, wherein said heat source comprises a heating element coupled to said blocking contact such that said heating element is in thermal contact with said blocking contact, said heating element configured to increase an operating temperature of the image detecting device.

15. An imaging system in accordance with claim 14 wherein said blocking contact comprises at least one of a gold material and a platinum material.

16. An imaging system in accordance with claim 14 wherein said image detecting device further comprises an insulation material surrounding at least a portion of said substrate, said insulation material configured to facilitate maintaining the increased temperature within the image detecting device.

17. An imaging system in accordance with claim 14 wherein said heat source comprises:
   a heat generating device coupled adjacent to said substrate; and
   a fan assembly configured to channel an airflow through said heat generating device to facilitate increasing a temperature of the air, and to channel the heated airflow to said substrate to facilitate increasing the operational temperature of the image detecting device.

18. An imaging system in accordance with claim 14 wherein said heat source is configured to increase an internal temperature of said substrate to between approximately 10° C. and approximately 100° C.

19. An imaging system in accordance with claim 14 wherein said image detecting device comprises:
   an insulation layer at least partially surrounding said image detecting device;
   at least one of a heat source and a cooling system; and
   a control system to facilitate controlling a temperature of said image detecting device independent of image detecting device surroundings.

* * * * *